Patented Nov. 27, 1951

2,576,763

UNITED STATES PATENT OFFICE 2,576,763

VANADIUM CONTAINING BRIQUETTES

Arthur Linz, New York, N. Y., assignor to Climax Molybdenum Company, New York, N. Y., a corporation of Delaware No Drawing. Application March 22, 1950, Serial No. 151,303

1 Claim. (Cl. 75—133)

The present invention relates to a novel and improved addition material for the production of vanadium containing ferrous alloys, as well as to a novel and improved process for the recovery and utilization of vanadium containing materials.

Objects and advantages of the invention will be set forth in part hereinafter and in part will be obvious herefrom, or may be learned by practice with the invention, the same being realized and attained by means of the processes, steps and compositions pointed out in the appended claims.

The invention consists in the novel steps, arrangements, compositions and improvements herein shown and described.

Heretofore, it has been proposed to mix vanadium oxides with carbonaceous material and to briquette the mixture so as to form briquettes suitable for the production of ferrous alloys. In such briquettes, the mixture is usually an oxide of vanadium mixed with pitch, coke, calcium carbide or other carbonaceous material as the reducing agent. Prior patents on such briquettes are as follows: United States Patents Nos. 2,381,675 of 1945 and 2,470,935 of 1949 and Luxemburg Patent No. 25,762 of 1939.

However, the prior briquettes are formed by using relatively high grade vanadium oxide material obtained by concentrating, roasting, leaching and converting vanadium ore, entailing extra expense on that account. Such processes also involve some loss of vanadium and due to all of these factors, the cost of the briquettes is relatively high.

I have discovered that certain industrial wastes can be utilized for the formation of vanadium briquettes without the concentrating, leaching and converting steps heretofore required, and that these wastes which are rich in vanadium need only be roasted and briquetted, or may be used as the major source of vanadium. The roasted waste is then enriched with purified, concentrated or converted vanadium oxide in a minor amount, if desired, for the formation of the briquettes.

In particular, the wastes which I prefer to use are wastes from the processing and refining of certain petroleum products such as fuel oil, gasoline, in which waste products, particularly in the asphaltic petroleum wastes from certain of the oil fields, the ash, soot and flue dusts are exceedingly rich in vanadium.

Those petroleum wastes and residues which contain large amounts of vanadium compounds, usually contain no harmful quantities of other elements and the vanadium contained is suitable for alloying use without any purification or refinement. With certain crudes, the ash from the oil wastes contains as much as 50% vanadium. In Oklahoma crudes, the ash often contains as much as 22%, in Iranian crudes it often contains from 14% to 39% of vanadium (calculated as $V_2O_5$), while in Venezuelan crudes the flue dust contains from 14% to 47% or more of vanadium, calculated as $V_2O_5$. Vanadium is an important constituent of the ash, flue dust and other residues of petroleum from other fields including those from Texas, Mexico, Egypt, Iraq, Peru, etc. and is a common constituent, although in many petroleums the vanadium content is too low to be of use in accordance with the present invention.

Heretofore the vanadium content of such crudes has been recovered by extraction or leaching, purification, and conversion as for instance in patent to Baldeschwieler 1,563,061 of 1925 and Oberle 1,570,170 of 1926.

Vanadium usually occurs in crude petroleum oil as a sulfide or as an organic sulfur containing compound of vanadium. It is usually accompanied by nickel and minor quantities of such harmless impurities as iron, calcium, sodium, aluminum, silicon and magnesium compounds which need not be removed from the residues. The petroleum flue dust or ash is substantially free of sulfur and needs no treatment, except drying, to render it suitable for briquetting with the reducing agents.

After the flue dust or ash has been analyzed to ascertain its vanadium content, it is then enriched with one of the purer vanadium oxides, preferably vanadium pentoxide, after which it is mixed with the necessary quantity of carbon in the form of pitch, coke, asphalt or other carbonaceous material sufficient to convert the oxide to carbon monoxide as the vanadium is reduced to its metallic form. The other reducible metals are also reduced and enough carbon must be present to reduce them at the same time, although the impurities such as the oxides of the first, second and third group metals (such as sodium, calcium, magnesium, aluminum) will not be reduced as the vanadium oxide is reduced.

Thus, using a thousand pounds of a petroleum flue dust or ash which contains about 42% of vanadium pentoxide and about 5.3% of nickel oxide, with the remainder of it being impurities such as oxides of iron, aluminum, silicon, calcium, magnesium and minor other constituents, it would be mixed with 535 pounds of 89% vanadium pentoxide and with 100 pounds of pitch, coke or asphalt or other carbonaceous material and with 460 pounds of some more active reducing agent than carbon, such as aluminum powder, silicon metal in finely crushed form, finely crushed ferrosilicon cntaining about 50% silicon. Such a mixture is thoroughly mixed and is formed into briquettes which are highly compressed and of convenient size, such as 8.5 pounds each. If made from the mixture set forth above, they would contain about 3.6 pounds vanadium pentoxide each, or about 2.0 pounds of available vanadium per 8.5 pound briquette.

The vanadium-containing petroleum ash and flue dusts, while not as rich in vanadium as concentrates, are more readily reduced when intimately mixed with reducing agents, such as ferrosilicon and carbonaceous material, due to the extremely fine state of division of the vanadium oxides in the residues, and the expense of extracting, purifying and converting the vanadium is avoided.

In general, the petroleum ash used contains at least 20% of vanadium, calculated as the pentoxide, and such an ash is used in at least as large a quantity as the concentrated vanadium pentoxide. Thus, for a flue dust or ash containing 20% vanadium pentoxide, it would be enriched by as much as an equal amount of concentrated vanadium pentoxide containing about 90% vanadium pentoxide. In such a case the briquettes might be formed from 1000 pounds flue ash 20% $V_2O_5$
900 pounds concentrate 90% $V_2O_5$
480 pounds 50% ferrosilicon
120 pounds pitch and each 10 pound briquette would contain about 2 pounds of vanadium.

The amount of carbonaceous binder used is preferably only enough to give the desired mechanical strength and the main reducing agent is from 15% to 30% of some more highly active material, such as ferrosilicon, from 40% to 60% silicon, aluminum powder or granules, or calcium carbide. Such reducing agents are used to the extent necessary to fully reduce the vanadium, it being assumed that the lower oxides of the reducing agent are formed at the temperature of reduction. Thus, so far as the carbonaceous agent is included, it is considered as being oxidized to carbon monoxide, and not carbon dioxide. Thus, when using high grade ferrosilicon and pitch, the silicon content is approximately one-quarter the weight of the vanadium pentoxide content and the pitch is used in about 5% to 10% of the finished mass of the briquetting mix. Thus using enough material to provide 1000 pounds of $V_2O_5$, the reducing agent would comprise 200 to 300 pounds of silicon as ferrosilicon and enough additional carbon, as pitch, to bind the particles together and to fully reduce the vanadium pentoxide to vanadium. If aluminum is used, it may be from 150 to 225 pounds of granules, chips, powder or the like and mixed with enough pitch to form from 5% to 10% of the briquettes.

Preferably, a booster or powerful oxidizing agent, such as potassium chlorate or sodium nitrate, is added to the mixture to be briquetted and forms from 1% to 3% of the mass and serves to rapidly initiate the reduction reaction.

The briquettes of the present invention are usually used as a late addition material and are generally added to the molten steel in the ladle shortly prior to the time of pouring. When so added, the heat of the molten metal starts reduction of the metal oxides by the aluminum or silicon and the reduction is carried to completion by the carbon with the evolution of gaseous carbon monoxide and the solution of the reduced vanadium in the molten steel.

The invention in its broader aspects is not limited to the specific process and steps shown and described but departures may be made therefrom within the scope of the accompanying claim without departing from the principles of the invention and without sacrificing its chief advantages.

What is claimed is:

A vanadium containing briquette for use in making ferrous alloys comprising an intimate mechanical mixture of a vanadium bearing petroleum ash or soot containing at least 20% vanadium pentoxide, a lesser quantity of concentrated vanadium pentoxide, ferro-silicon containing at least about 40% silicon and present in the briquette in an amount from about 15-30% of the contained vanadium pentoxide, and a carbonaceous binder which is from about 5-10% of the mass.

ARTHUR LINZ.

REFERENCES CITED

The following references are of record in the file of this patent:

UNITED STATES PATENTS

| Number | Name | Date |
|---|---|---|
| 1,119,643 | Saklatwalla | Dec. 1, 1914 |
| 2,300,944 | Linz | Nov. 3, 1942 |
| 2,381,675 | Linz | Aug. 7, 1945 |